(12) United States Patent
Kronthaler et al.

(10) Patent No.: US 11,389,891 B2
(45) Date of Patent: Jul. 19, 2022

(54) METHOD FOR WELDING WORKPIECES TOGETHER AND ONE APPLICATION OF THE METHOD

(71) Applicant: ANDRITZ Soutec AG, Neftenbach (CH)

(72) Inventors: Michael Kronthaler, Bachenbülach (CH); Hanspeter Meyer, Hüttwilen (CH); Jean-Frédéric Clerc, Bülach (CH); Daniel Stäubli, Wettingen (CH)

(73) Assignee: ANDRITZ Soutec AG, Neftenbach (CH)

( * ) Notice: Subject to any disclaimer, the term of this patent is extended or adjusted under 35 U.S.C. 154(b) by 563 days.

(21) Appl. No.: 16/415,331

(22) Filed: May 17, 2019

(65) Prior Publication Data

US 2019/0358735 A1 Nov. 28, 2019

(30) Foreign Application Priority Data

May 23, 2018 (EP) ..................... 18173891

(51) Int. Cl.
| | |
|---|---|
| *B23K 15/00* | (2006.01) |
| *B23K 26/08* | (2014.01) |
| *B23K 37/04* | (2006.01) |

(52) U.S. Cl.
CPC ...... *B23K 15/0006* (2013.01); *B23K 26/0838* (2013.01); *B23K 37/0408* (2013.01)

(58) Field of Classification Search
CPC .......... B23K 15/0006; B23K 2101/006; B23K 2101/185; B23K 26/03; B23K 26/044;
(Continued)

(56) References Cited

U.S. PATENT DOCUMENTS

| | | | | |
|---|---|---|---|---|
| 4,824,007 A | * | 4/1989 | Depaoli ............... | B23K 26/244 228/102 |
| 5,023,427 A | * | 6/1991 | Neiheisel ............. | B23Q 3/1543 219/121.82 |

(Continued)

FOREIGN PATENT DOCUMENTS

| | | |
|---|---|---|
| DE | 10113471 A1 | 10/2002 |
| EP | 0823304 A1 | 2/1998 |

(Continued)

*Primary Examiner* — Dana Ross
*Assistant Examiner* — Joseph W Iskra
(74) *Attorney, Agent, or Firm* — Alix, Yale & Ristas, LLP

(57) ABSTRACT

A method for butt-welding of sheet metal, especially bodywork in the motor vehicle industry, where at least two flat workpieces with any desired contours are fed to a machining process. In a first sub-process, the workpieces are positioned in relation to one another forming a minimal gap and secured in place with holding means. In another sub-process, the position and width of the gap are measured continuously immediately before welding together and the measurements are used to control a laser welding head. The laser welding head is fit with a rotatable twin-spot lens, where the relative alignment of a main spot to an auxiliary spot is controlled depending on the absolute position of the gap and the gap width during the welding process while the processing lens of the laser welding head is rotated around the laser beam axis with the angle of rotation alpha.

19 Claims, 9 Drawing Sheets

(58) Field of Classification Search
CPC ............ B23K 26/0676; B23K 26/0838; B23K 37/0408
USPC .................................................. 219/121.64
See application file for complete search history.

(56) References Cited

U.S. PATENT DOCUMENTS

| | | | |
|---|---|---|---|
| 5,204,505 A | | 4/1993 | Prange et al. |
| 5,328,083 A | * | 7/1994 | Peru .................. B23K 26/0838 228/5.7 |
| 5,814,786 A | * | 9/1998 | Johnson ................ B23K 26/26 219/121.63 |
| 6,034,347 A | * | 3/2000 | Alber ................ B23K 15/0006 219/121.63 |
| 6,339,207 B1 | | 1/2002 | Bishop |
| 10,052,707 B2 | | 8/2018 | Henry et al. |
| 2006/0261045 A1 | | 11/2006 | Wang et al. |
| 2016/0184929 A1 | * | 6/2016 | Staubli ............... B23K 26/0846 219/121.64 |
| 2020/0156185 A1 | | 5/2020 | Vila I Ferrer et al. |

FOREIGN PATENT DOCUMENTS

| | | | |
|---|---|---|---|
| JP | 2947612 | B2 | 9/1999 |
| JP | 2004298964 | A | 10/2004 |
| JP | 2016078075 | A | 5/2016 |
| WO | 0000320 | A1 | 1/2000 |

\* cited by examiner

METHOD FOR WELDING WORKPIECES TOGETHER AND ONE APPLICATION OF THE METHOD

BACKGROUND

The disclosure relates to a method for butt-welding of workpieces, especially tailored welded blanks used in the manufacture of bodywork in the car industry.

At least two flat workpieces are positioned in relation to one another and secured there in a first sub-process in such a way that a minimal gap is formed between the two edges to be welded together. In another sub-process, the position and the width of the gap are measured continuously directly before welding together. These measurements are then used to control a laser welding device, where at least the welding rod feed and the processing lens are controlled on the basis of the measurements.

Tailored Blanks (TB) or also Tailor Welded Blanks (TWB) were developed in order to manufacture sheet-metal blanks that were broader than those that could be produced using the rolling technology available at the time. Nowadays, manufacturers mainly make use of the advantage that blanks can be made up of different material grades or sheet thicknesses, also with less scrap. This makes it possible to adapt various parts of the subsequent workpiece to the loads occurring locally in the future, which would otherwise require additional reinforcing parts. The advantages are savings in weight and manufacturing costs. TWBS are used widely in the car industry for the manufacture of car bodies, where welded parts are made from single metal sheets—after preparation of the sheet edges if necessary. There are two welding methods known, especially for laser welding: In a first method, metal sheets are positioned exactly, clamped in place and welded together by a movable welding head. With the other method, metal sheets coming from parallel tracks are fed to a stationary welding tool and welded together. Both methods require a high degree of mechanical precision in order to process a maximum gap width that is currently in the region of 0.3 mm.

A method and a device for performing the process is described in patent specification U.S. Pat. No. 5,328,083, which does not however disclose how the welding tool is positioned exactly in relation to the current part of the seam. Inaccuracies in the blanks and shifts in the position of the seam can lead to faulty welds.

The European patent specification EP 0450349 relates to a method for continuous welding of butted strip or sheets by means of a laser beam, without additional materials being added, where the material to be welded is cooled in the area of the weld directly behind the welding focus in strip running direction—depending on the width of the gap formed by the abutting edges. The present publication also proposes a device for continuous welding of abutting sheets or strips by means of a stationary laser beam, with straightener rolls arranged vertically to their running direction in pairs on both sides of the strips to be welded together and which form a minimal gap in the area where the strips abut and which the stationary laser beam hits when welding the abutting edges together.

In European patent specification EP 0817698 B1, a method is described for continuous butt-seam welding of metal plates, where the relative position of the metal plates and thus the precision of the seam is maintained within a specified tolerance range. This method deliberately does without mechanically precise alignment of the metal plates to be welded together; instead, the laser tool follows the path of the two abutting metal plates by means of sensor equipment to determine the gap width and position continuously. Hereafter, a control loop can be used to permanently adjust the performance of the weld beam and the required cooling performance for the welding process (gas, water). A system of this kind requires a great deal of maintenance.

In industrial manufacturing technology, laser is gaining more and more importance due to the large number of technological advantages. These advantages result primarily from the targeted application of energy to the workpiece, for a limited time and over a limited area, and the resulting high machining speed. Lightweight car body production opens up considerable potential in terms of manufacturing engineering for laser welding.

Scenarios in which the gap situation can vary from workpiece to workpiece, where A-shaped, V-shaped, parallel and zero gaps, or mixed combinations thereof occur, are challenging in laser welding. Large gap dimensions result in a loss of absorbed laser energy through the gap. It is possible to reduce this loss to a certain extent by defocusing the monofocus. However, this inevitably also reduces the maximum intensity of the laser beam. Whereas the root penetration ability, that is to say full penetration of the workpiece by means of the metal vapour capillary during laser welding, is also reduced with a technical zero-gap. This can be compensated to a certain extent either by a lower welding speed or a higher laser output. In summary, it is true to say that an area of tension forms in the application between gap bridging capability and root penetration. In order to guarantee optimum productivity, the laser beam sources are operated at the design limit of the laser output. A change in the welding speed during welding work is not possible in many plant concepts due to the reaction time. This leads generally to reduced productivity.

In the car industry nowadays, door rings are made of tailored welded blanks (TWB). Such door rings typically comprise up to eight individual parts, but a larger number is also conceivable. The sheet thickness of the individual parts can also vary here. Due to the shape and manufacturing tolerances for the individual parts, there is normally unfavourable gap formation, at least at one of the welds in the finished part, as a result of the ring being closed. Subsequently, the fact that the gap situation can differ from door ring to door ring, where different types of gap situation can occur, makes efficient production more complicated. Proficiency with V-shaped welds is the biggest challenge here.

Poor welding quality means that undesirable cracks can occur in the weld seams during door ring crash tests. Due to safety considerations, this risk is not acceptable in the production of door rings.

Currently, three methods are known for closing variable gaps of up to a maximum of 0.3 mm by adding flux-cored wire.

Several approaches have been pursued so far to solve the problem of processing wide welding gaps. For example, the idea of a scan tracker with monofocus pursues the idea that a laser beam with a small focus diameter (0.2 mm to 0.3 mm) and high intensity oscillates at right angles across the welding assignment. The amplitude and the laser output is varied depending on the gap width. However, trials with the system technology available on the market for welding blanks show that, due to the frequencies achievable, the period length of the oscillating motion does not guarantee full coverage of the remelted material at high welding speeds of approximately 10 m/minute. In order to generate acceptable weld seams, the welding speed would have to be reduced significantly, which would lead to a loss of productivity regardless of whether there is a gap or a zero-gap.

The idea of the trifocal laser with at least three monofocuses pursues the approach of adapting the intensity distribution through three fibre-coupled laser beam sources according to the gap width by means of beam forming and thus filling larger gaps without any loss of productivity. Two spots with a small diameter are used here at the front and one spot with a large diameter at the rear. The geometrical arrangement of the spots cannot be changed and is only suitable for one area of application. The change is made via the output of the individual laser sources. However, in practical use the intensity of the small spots cannot be reduced enough to ensure that they do not generate any unwanted notches in the welding material. Due to the geometrical consistency, this concept only permits very little margin for adapting on the basis of the variable gap width during the production process.

Patent specification DE 101 13 471 B4 discloses a laser hybrid welding method in which a conventional welding process is combined with a laser. Two laser focal points are generated here. According to the disclosed embodiments, the spacing between the two focal points are varied constantly based on measurement of the individual parameters of the welding process, particularly the welding speed and the welding quality.

When welding tailored blanks, it is possible to weld variable gaps of up to a maximum of 0.3 mm with filler metal using the technology currently available. It is a challenge to close variable gaps up to approximately 1 mm dynamically with additional material (filler rod) and high welding quality.

Important criteria in a process for welding tailored blanks are the throughput of the overall plant on the one hand, i.e. how many parts can be produced per hour at an acceptable reject rate, and on the other hand the effort required to ensure both the quality of the overall machining process as well as the desired quality of the welded blanks.

A disadvantage in the aforementioned solutions and processes are the considerable technical effort for cooling the weld seam, for clamping the plates in a safe way for the process, for discharging the welding fumes and spatters from the plant, as well as the capacity and thus also the productivity of the overall plant. In general, either the welding lens is designed to be movable and the blanks to be welded are stationary in such plants, or the welding material is fed in continuously and the welding lens is stationary during the welding process. A subsequent disadvantage is the substantial effort required to load and unload the conveyor belts.

SUMMARY

The inventive embodiments disclosed herein are based on the task of describing a method by which the above mentioned disadvantages are eliminated.

In one embodiment, a laser welding device is designed as a laser with rotatable twin-spot lens, comprising one main and one auxiliary spot. The relative alignment of the main spot and the auxiliary spot to one another is controlled during the welding process depending on the absolute position of the gap and the gap width by rotating the processing lens of the laser welding device around the axis of the laser beam at the angle of rotation alpha.

With this structure, the position of the laser spots can be changed in relation to the welding gap and adapted to different gap widths simply by rotating the processing lens.

Surprisingly it was noted that the system is particularly effective as from gap widths larger than 0.2 mm and that it is not absolutely necessary to rotate the processing lens at gap widths smaller than 0.2 mm. Hence, it is an advantage if the relative alignment of the main spot and the auxiliary spot is controlled as from a measured gap width of more than 0.2 mm.

At gap widths of less than 0.2 mm, the main spot can then be at the front when viewed in welding direction and the auxiliary spot behind it, where the connecting line between the centres of the two spots runs in parallel to the welding direction. This is equal to an angle of rotation alpha of 0 degrees.

It is also an advantage if not only the gap width and the gap position, but also the shape of the gap edges are determined or measured and the relative alignment of the main spot and the auxiliary spot to each other is controlled during the welding process, also depending on the shape of the edges. Different edge or gap shapes are shown in FIG. 4, for example. It is also an advantage if the determined shape of the gap edges is used to control the laser output.

It has been noted that additional offset (Y-offset) of the laser spots in a direction perpendicular to the transport direction of the workpieces can have a positive effect on the welding result, depending on the shape of the edges (rounded, sharp, with burr). This means it was also established that the central point between the main spot and the auxiliary spot must not always be in the centre of the gap in order to achieve optimum welding results. Cases in which this central point has a certain amount of offset to the centre of the gap are also conceivable. Thus, it is an advantage if the process lens is also moved in a direction perpendicular to the transport direction of the workpieces so that the central point between the two spots is offset in relation to the centre of the gap.

It is preferable if the spacing between the two spots remains constant.

For example, the auxiliary spot can be rotated around the main spot at the back when viewed in welding direction.

However, it is also conceivable that the axis of rotation around which the two laser spots are rotated as a single unit lies between the main spot and the auxiliary spot and on the rear spot, respectively.

It is favourable if the processing lens is movable in relation to the workpieces to be welded together, preferably in a direction perpendicular to the transport direction of the workpieces (on the plane of the workpiece). The relative speed between the workpieces to be joined together and the processing lens is equal to the welding speed ($v_{MatFlow}$).

The welding speed ($v_{MatFlow}$) can be constant during the welding process, but can also be controlled depending on the gap width, the plate thickness or the plate edge quality.

The same applies to the laser output during the welding process.

The laser output can also be controlled depending on the position of the twin-spot lens.

This disclosed method enables efficient and reliable industrial manufacture of tailored welded blank (TWB) parts, especially door rings for the car industry. Here, the blanks are secured on a conveyor belt from below using magnetic forces so that the machine is guaranteed to be accessible from above. Workpieces can be reliably joined in a TWB arrangement without losses in productivity and results in an enlarged process window in terms of gap width and edge quality of the input material compared to the state of the art. In particular, the solution proposed also makes it possible to master the large challenges in closing V-shaped gap situations reliably. Due to enlargement of the process window, the overall reject rate is reduced, thus significantly increasing productivity overall. In addition, the welding quality can be improved.

As the blanks can be secured reliably for the process over a longer transport distance, a movable or "flying" lens can also be used, as described in European Patent Specification EP 3038789 A1, which means that the capacity of the machine in comparison with other machines using conventional concepts can be increased by up to 20%. Hereafter, the magnetic retaining principle has a positive effect on maintaining the smallest possible gap between the blanks to be welded together, meaning that a better quality of weld seam can be achieved.

BRIEF DESCRIPTION OF THE DRAWINGS

The present invention is further explained in the following on the basis of example embodiments and referring to drawings. In the drawings.

DETAILED DESCRIPTION

Figure 1:
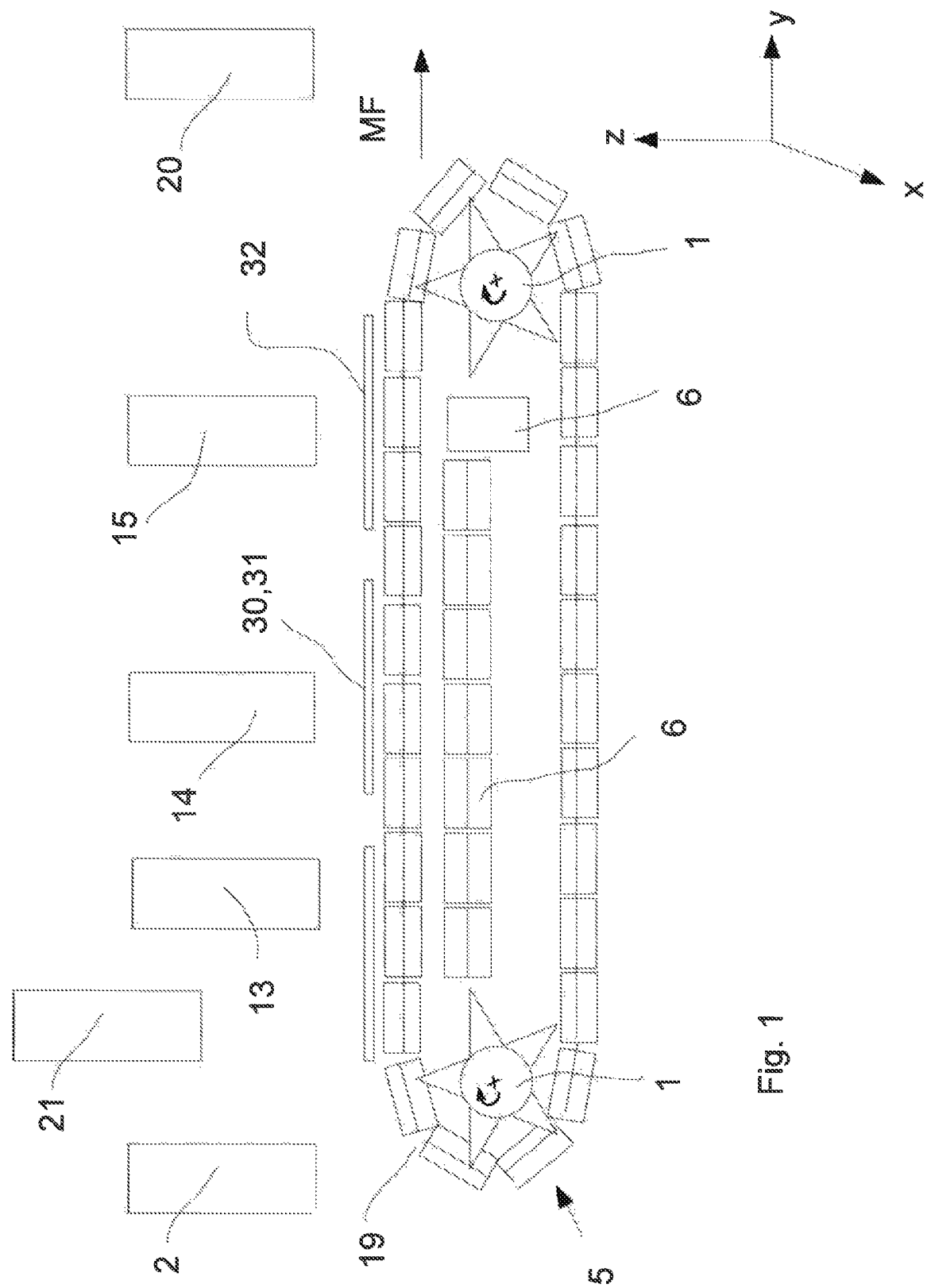
FIG. 1 shows a schematic view of a plant according to the disclosure in cross-section.

In a cross-sectional view, FIG. 1 shows a magnetic chain conveyor 5 with the endless conveyor belt 19, which is movable in material flow direction MF via the drive pinion 1 and which is loaded with magnetizable workpieces 30, 31 by means of feed devices 2. These workpieces are held very firmly on the conveyor belt 19 by magnetic holding means 6. The edge detecting system 13 enables exact determining of the spaces (gap) between the workpieces 30, 31 and the edge geometry of the workpieces 30, 31. The workpieces 30, 31 are welded together by a welding head 14 according to FIG. 5 that is movable in directions x and y perpendicular to the cross-section view and moves in material flow direction MF on a conveyor belt 19. The welded workpieces 32 are inspected by a quality control system 15, and means of further processing 20 are applied to them. Welding may be preceded by a coating removal process to prepare the workpieces, where this process can take place in a preceding process step or also beforehand in a separate coating removal plant 21 (ablation plant).

Figure 2:
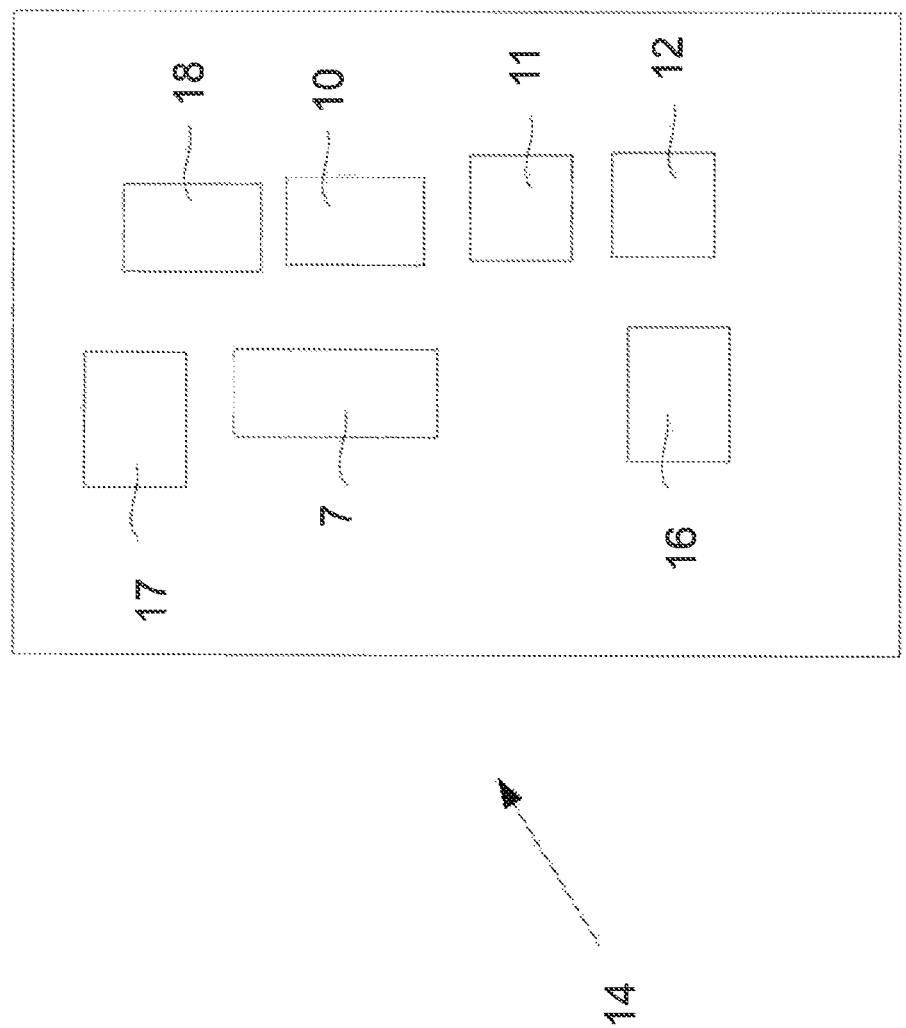
FIG. 2 shows a schematic view of a laser welding head.

FIG. 2 shows a schematic view of a laser welding head 14 with processing lens 7, which is designed as a laser with double focus and is provided with a rotary lens drive 17 for rotating around an axis parallel to or at an acute angle to the z axis. The focus is moved perpendicular to the welding plane in the z direction by means of the focus axle drive 10. The laser axis is corrected by means of the laser axis correction drive 18. The additional amount of filler rod needed for the welding process is supplied via the additional filler rod feed 11 at additional filler rod speed by means of the additional filler rod drive 12. Furthermore, the process zone can be gasified in addition with a suitable process gas in order to improve the welding quality. Finally, the suction system 16 removes the contaminants and welding particles collecting during the welding process.

Figure 3:
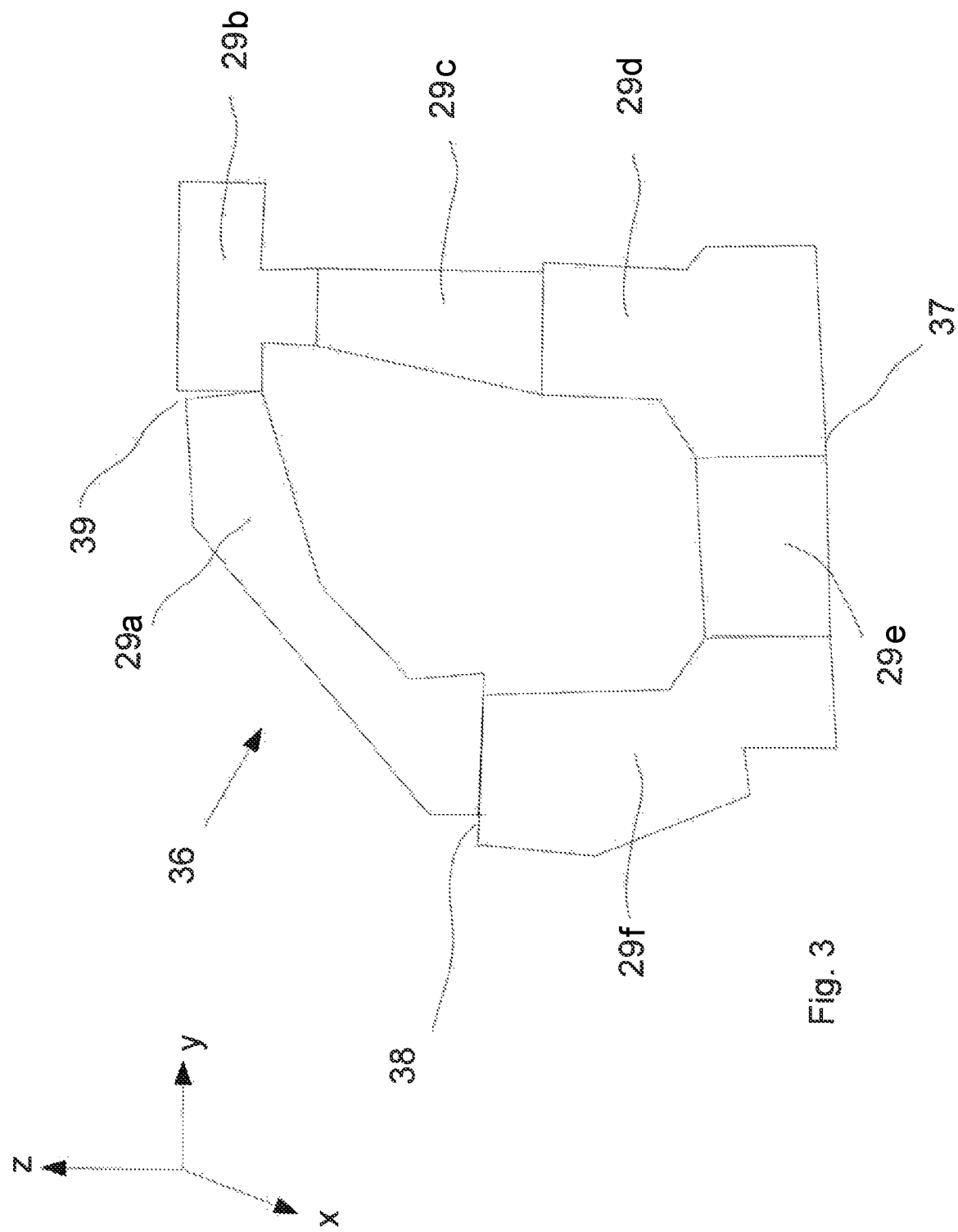
FIG. 3 shows a schematic view of workpieces with gap problems in one application.

FIG. 3 depicts hypothetical problems with alignment and resulting gap in attempting to arrange the individual workpieces 29a, 29b, 29c, 29d, 29e and 29f (collectively referred to with reference numeral 29) of a door ring 36 in a schematic diagram. The individual workpieces 29a, 29b, 29c, 29d, 29e and 29f have a minimal angle imperfection due to the production process. As a result of such small angle imperfections, other defects are caused elsewhere in the door ring 36, for example a linear misalignment 38, an angle error 37 in the closing gap or a gap 39 between two of the individual workpieces 29a, 29b, 29c, 29d, 29e and 29f.

Figure 4:
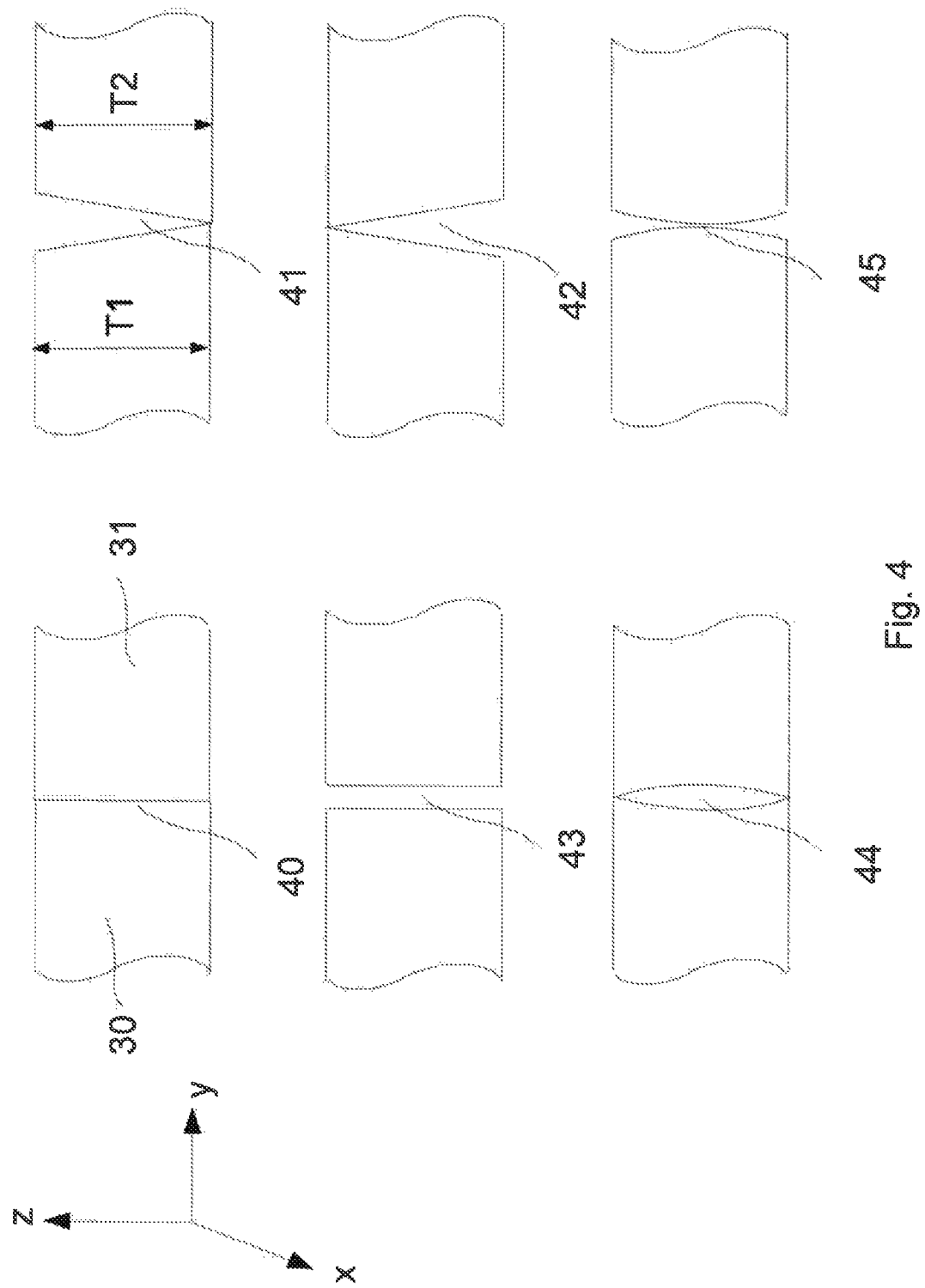
FIG. 4 shows a schematic view of possible gap shapes between two workpieces in cross-section.

FIG. 4 shows exemplary gap shapes 39 between two workpieces 30, 31 with plate thicknesses T1 and T2, especially zero gap 40, opening gap 41, closing gap 42, parallel gap 43, belly gap 44 and waist gap 45, in a schematic diagram. Other gap shapes and mixtures of several shapes are also possible. This edge shape can be measured and the measuring signal for relative alignment of the main spot and the auxiliary spot to one another or in relation to the welding direction can be used.

Figure 5:
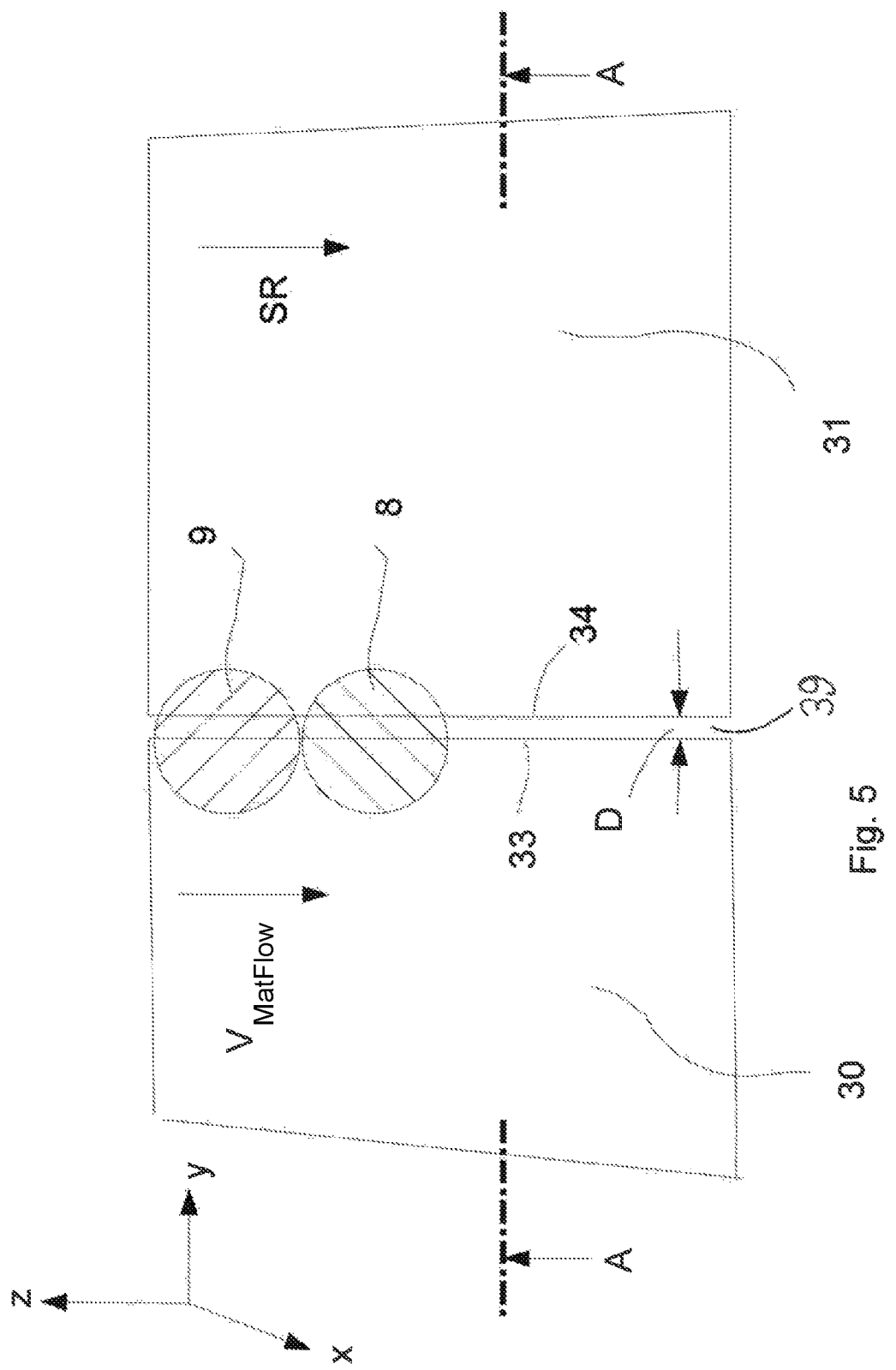
FIG. 5 shows a schematic view of a first top-view of the conveyor belt loaded with two workpieces in a plant according to the disclosure.

FIG. 5 shows a schematic view from the top of the conveyor belt loaded with two workpieces 30, 31 on welding plane xy in the plant. The gap 39 with gap width D between the welding edges 33, 34 is closed by means of a welding process. This process works with a twin-spot lens laser with the main spot 8 at the front in the welding direction SR and the auxiliary spot 9 at the rear in the welding direction SR at the welding speed $V_{MatFlow}$, where alignment of the two spots 8, 9 is controlled according to the current welding conditions depending on the gap geometry. Preferably, as shown here, the central point (viewed from the centres of the spots) between the main spot 8 and the auxiliary spot 9 is not on the gap centre line, but is offset in direction y. In other words, the main spot 8 and the auxiliary spot 9 are offset relative to the gap 39 along the y axis in that the gap 39 does not extend over a diameter of either of the main spot 8 and the auxiliary spot 9. These relationships can be seen clearly in FIG. 5. This lateral offset positioning is advantageous (y offset) if, for example, the two welding edges have different shapes.

Figure 6:
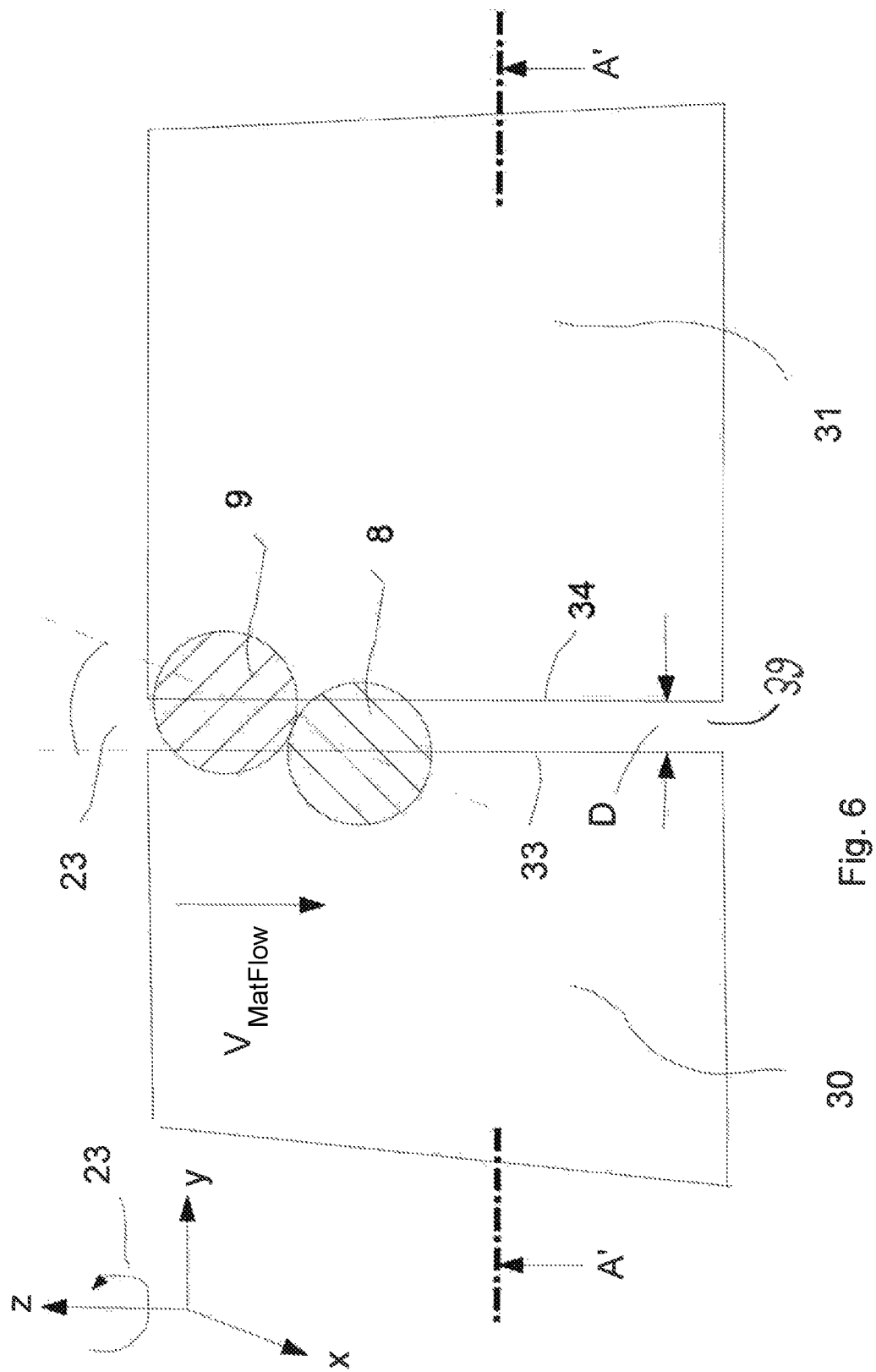
FIG. 6 shows a schematic view of a second top-view of the conveyor belt loaded with two workpieces in a plant according to the disclosure.

FIG. 6, on the other hand, shows another schematic view from the top of the conveyor belt loaded with two workpieces 30, 31 on the welding plane xy in a plant, where alignment of the two twin spots—the main spot 8 and the auxiliary spot 9—is rotated through an angle of rotation alpha 23 about the z axis perpendicular to the welding plane xy depending on the gap width D.

Figure 7:
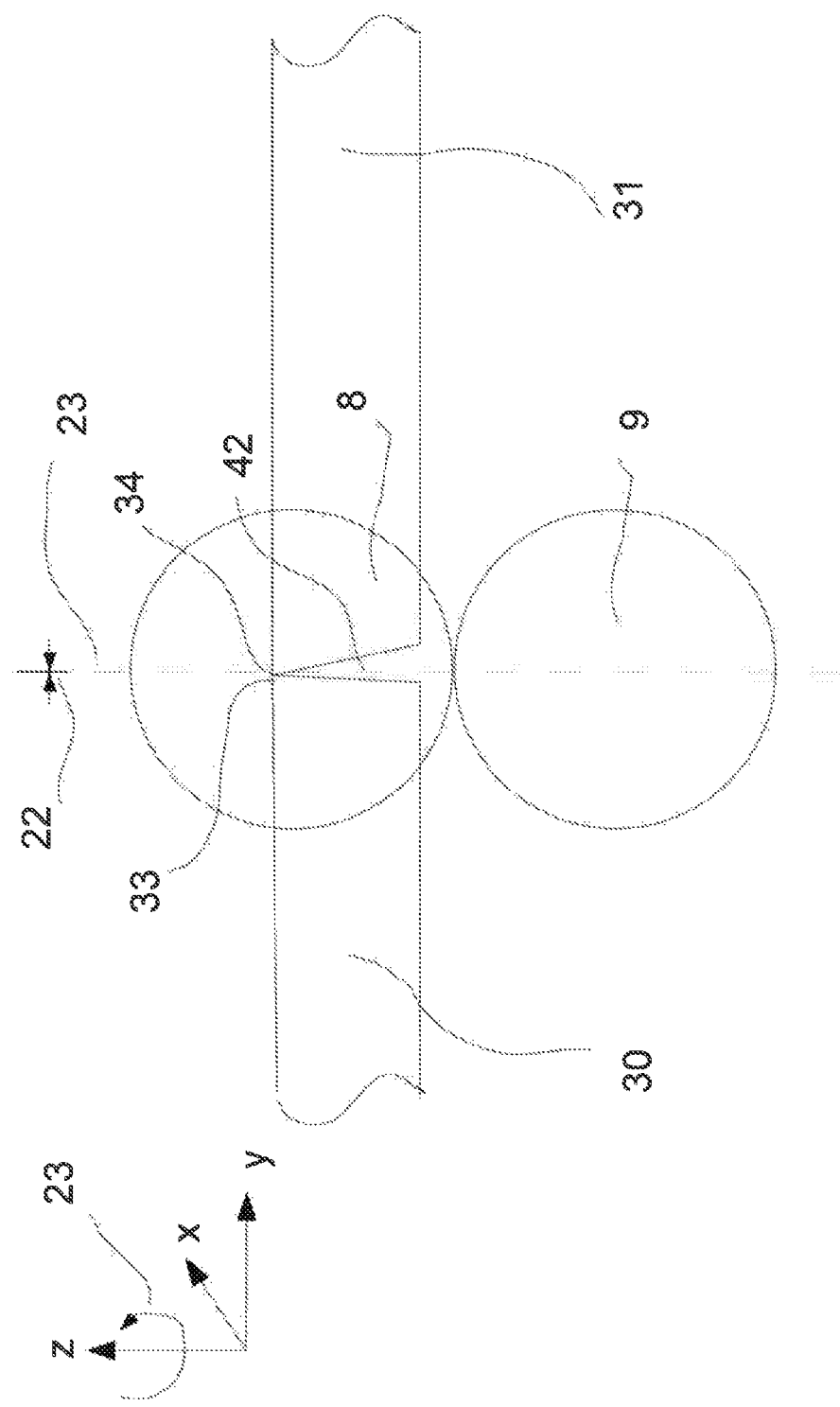
FIG. 7 shows a first sectional view A-A of the two workpieces according to FIG. 5, where the view of the twin spots has been swung out of the xy plane into the yz plane.

In a first sectional view A-A according to FIG. 5, FIG. 7 shows the two workpieces 30, 31 with the twin spots movable in the xy welding plane—the main spot 8 and the auxiliary spot 9, where the view of the twin spots 8, 9 is swung out of the xy plan into the yz plane. A closing gap 42 between the two workpieces 30 and 31 is shown as an example, where the two welding edges 33, 34 touch at the upper end of the workpieces 30, 31. The angle of rotation alpha 23 is zero degrees and the y offset 22 is 0.0 mm.

Figure 8:
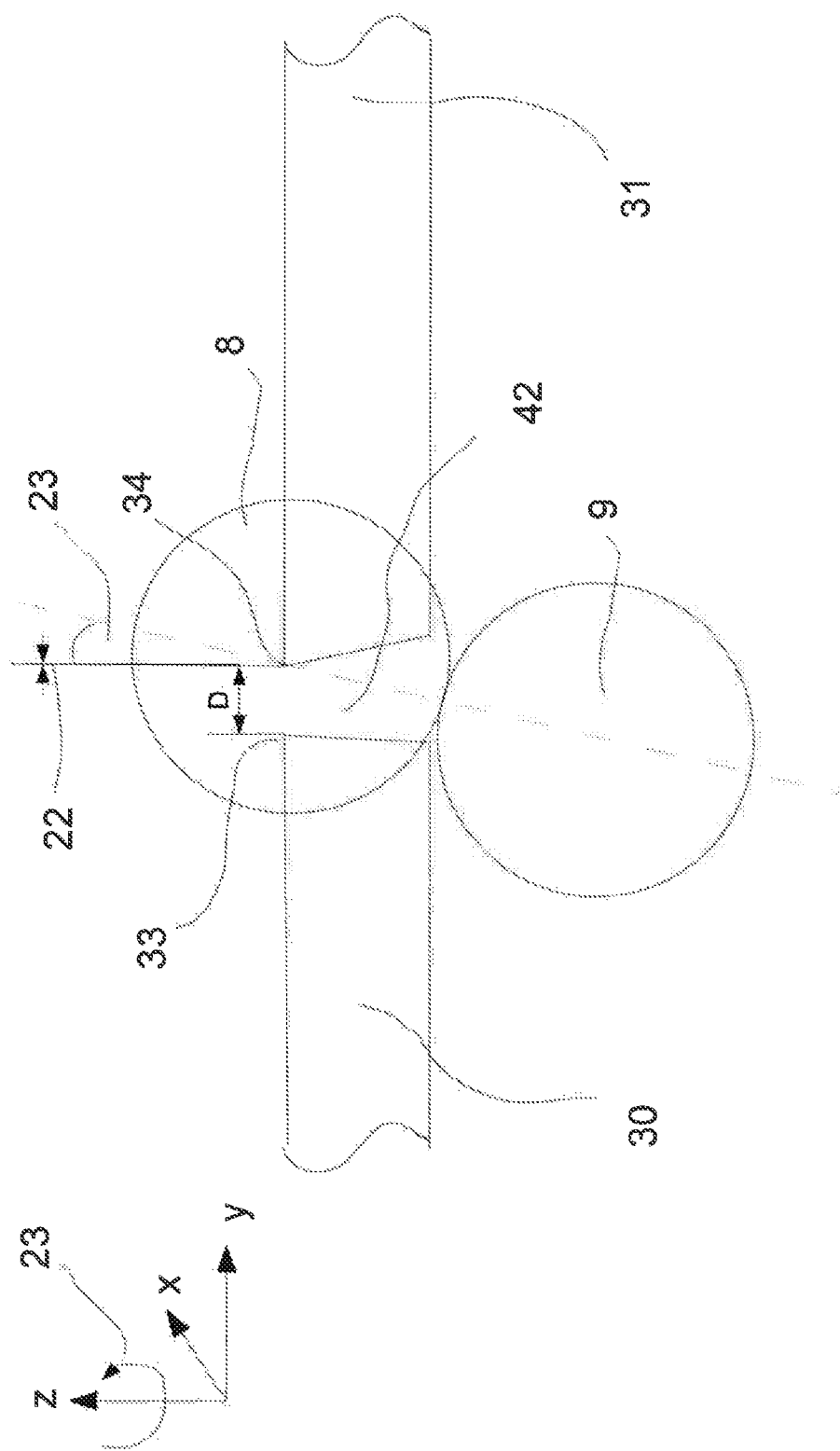
FIG. 8 shows a second sectional view A'-A' of the two workpieces according to FIG. 6, where the view of the twin spots has been swung out of the xy plane into the yz plane.

In a second sectional view A'-A' according to FIG. 6, FIG. 8 shows the two workpieces 30, 31 with the twin spots movable in the xy welding plane—the main spot 8 and the auxiliary spot 9, where the view of the twin spots 8, 9 is swung out of the xy plan into the yz plane. A closing gap 42 between the workpieces 30, 31 is shown as an example and the spacing between the two welding edges 33, 34 at the upper end of workpieces 30, 31 is D. The angle of rotation alpha 23 is approximately 20 degrees and the y offset 22 is 0.0 mm once again. The shape and characteristics of the gap edges are determined and used to control the twin spot lens accordingly.

Figure 9:
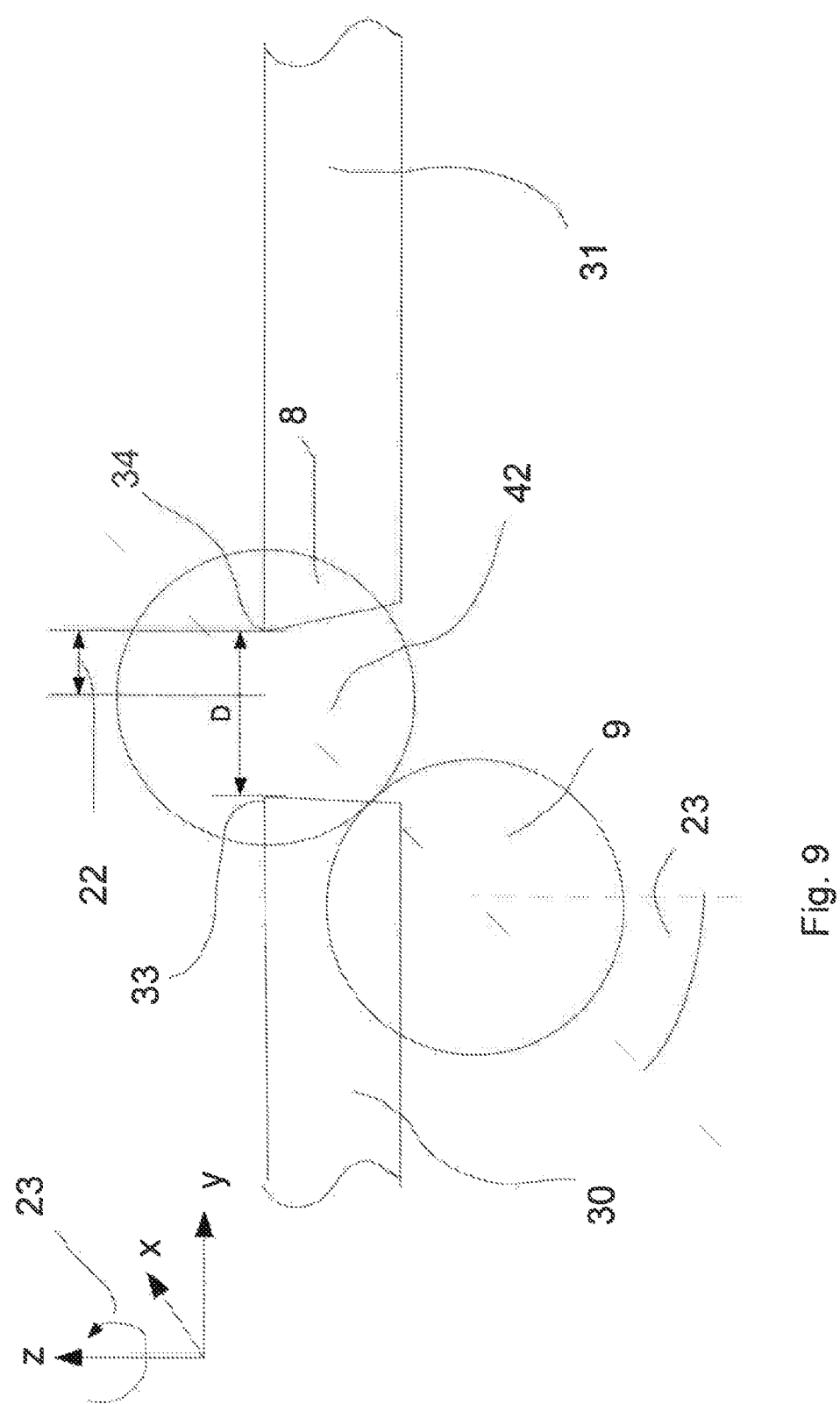
FIG. 9 shows a third sectional view A'-A' of the two workpieces according to FIG. 6, where the view of the twin spots has been swung out of the xy plane into the yz plane.

In a third sectional view A'-A' according to FIG. 6, FIG. 9 shows the two workpieces 30, 31 with the twin spots movable in the xy welding plane—the main spot 8 and the auxiliary spot 9, where the view of the twin spots 8, 9 is swung out of the xy plan into the yz plane. A closing gap 42 between workpieces 30, 31 is shown as an example. The spacing D between the two welding edges 33, 34 at the top end of the workpieces 30, 31 is D. The angle of rotation alpha 23 is approximately 40 degrees, and the y offset 22 is roughly 0.1 mm.

These descriptions are merely illustrative examples of the types of adaptations in the positioning of the main spot 8 and auxiliary spot 9 that are possible to accommodate the virtually countless sizes, shapes and configurations of gaps between adjacent workpieces.

Within the graphical representations shown in the drawings, reference numerals represent elements of the inventive embodiments, as follows:

1—Drive pinion
2—Feed device
5—Magnetic chain conveyor
6—Holding means
7—Processing lens
8—Main spot
9—Auxiliary spot
10—Focus axle drive
11—Additional filler rod feed
12—Additional filler rod drive
13—Edge detection system
14—Laser welding head
15—Quality assurance system
16—Suction system
17—Rotary lens drive
18—Laser axis correction drive
19—Conveyor belt
20—Means of further processing
21—Coating removal plant
22—Y offset
23—Angle of rotation alpha
29—Individual workpieces
30—Workpiece A
31—Workpiece B
32—Welded workpiece
33, 34—Welding edges
36—Door ring
37—Angle error
38—Edge offset
39—Gap
40—Zero gap
41—Opening gap
42—Closing gap
43—Parallel gap
44—Belly gap
45—Waist gap
D—gap width
T1, T2—Plate thickness
MF—Material flow direction
xy—welding plane
x—axis of welding direction (SR)
y—axis perpendicular to the welding direction
z—axis perpendicular to the welding plane xy
$V_{MatFlow}$—welding speed in material flow direction

What is claimed is:

1. A method for butt-welding of sheet metal, comprising:
feeding at least two flat workpieces formed of sheet metal with any desired contours to a machining process;
positioning the respective workpieces in relation to one another in a first sub-process by holding means, thereby forming a gap between the at least two welding edges to be welded together;
measuring a position and a width (D) of the gap continuously in another sub-process immediately before welding the at least two welding edges together to yield measurements; and
using the measurements to control a laser welding head via at least a welding rod feed and a processing lens of the laser welding head, wherein
at least the welding rod feed and the processing lens are controlled by the measured position and measured width (D) of the gap,
the laser welding head is fit with a rotatable twin-spot lens having a main spot and an auxiliary spot having a relative alignment to one another,
the relative alignment of a main spot relative to the auxiliary spot is controlled depending on an absolute position of the gap and the gap width (D) during the welding process while the processing lens of the laser welding head is rotated around a laser beam axis with the angle of rotation alpha, and
the relative alignment of the main spot and the auxiliary spot is controlled as from a measured gap width of more than 0.2 mm.

2. The method according to claim 1, comprising determining a shape of the gap edges, and controlling the relative alignment of the main spot and the auxiliary spot in the welding process in dependence on the shape of the edges.

3. The method according to claim 1, comprising rotating the auxiliary spot around the main spot at a rear position when viewed in a welding direction (SR).

4. The method according to claim 1, wherein the main laser spot and the auxiliary laser spot are rotated as a unit about an axis of rotation located between the main spot and the auxiliary spot.

5. The method according to claim 1, wherein the main laser spot and the auxiliary laser spot are rotated as a unit about an axis of rotation located at a rear position of the auxiliary spot when viewed in a welding direction (SR).

6. The method according to claim 1, wherein the respective workpieces travel at a welding speed ($V_{MatFlow}$), comprising moving the processing lens in relation to the workpieces, wherein a relative speed of the workpieces and the processing lens is equal to the welding speed ($V_{MatFlow}$).

7. The method according to claim 5, wherein the respective workpieces travel at a welding speed ($V_{MatFlow}$), comprising moving the processing lens in relation to the workpieces, wherein a relative speed of the workpieces and the processing lens is equal to the welding speed ($V_{MatFlow}$).

8. The method according to claim 1, wherein the respective workpieces travel at a welding speed ($V_{MatFlow}$) that is maintained substantially constant throughout the welding process.

9. The method according to claim 1, wherein the respective workpieces travel at a welding speed ($V_{MatFlow}$) that is varied during the welding process and controlled in dependence on the gap width (D).

10. The method according to claim 9, characterized in that the welding speed ($V_{MatFlow}$) is controlled in dependence on the sheet thickness (T1, T2).

11. The method according to claim 9, characterized in that the welding speed ($V_{MatFlow}$) is controlled depending on a quality measurement of the sheet edges.

12. The method according to claim 1, wherein an output of the laser is substantially constant during the welding process.

13. The method according to claim 1, wherein an output of the laser is varied during the welding process and is controlled in dependence on one or more variables from the group consisting of the gap width (D), the sheet thickness, (T1, T2) a sheet edge quality and the position of the twin spot lens.

14. The method according to claim 1, comprising moving the processing lens in one direction perpendicular to a conveying device for the workpieces as viewed on a plane defined by the workpieces.

15. The method according to claim 14, comprising aligning the processing lens in dependence on the shape of the welding edges such that a central point between the main spot and the auxiliary spot does not lie on the center line of the gap.

16. The method according to claim 1, wherein the processing lens is moved in a direction parallel to a direction in which the workpieces are conveyed.

17. The method according to claim 2, wherein the processing lens is moved in a direction parallel to a direction in which the workpieces are conveyed.

18. The method according to claim 2, wherein the main laser spot and the auxiliary laser spot are rotated as a unit about an axis of rotation located between the main spot and the auxiliary spot.

19. A method for butt-welding of sheet metal, comprising:
feeding two flat workpieces formed of sheet metal to a machining process;
positioning the respective workpieces in relation to one another in via holding means, thereby forming a gap between adjacent welding edges of the respective workpieces to be welded together;
continuously measuring a position and a width (D) of the gap immediately before welding the welding edges together to yield measurements; and
using the measurements to control a laser welding head via at least a welding rod feed and a processing lens of the laser welding head, wherein
at least the welding rod feed and the processing lens are controlled by the measured position and measured width (D) of the gap,
the laser welding head is fit with a rotatable twin-spot lens having a main spot and an auxiliary spot in a relative alignment to one another, and
the relative alignment of a main spot relative to the auxiliary spot is controlled depending on an absolute position of the gap and the gap width (D) during the welding process while the processing lens of the laser welding head is rotated around a laser beam axis with the angle of rotation alpha,
the relative alignment of the main spot and the auxiliary spot is controlled as from a measured gap width of more than 0.2 mm,
the respective workpieces are moved at a welding speed ($V_{MatFlow}$),
the welding speed ($V_{MatFlow}$) is controlled in dependence on one or more variable from the group consisting of sheet thickness (T1, T2) and a quality measurement of the welding edges, and
output of the laser is controlled in dependence on one or more variable from the group consisting of gap width (D), sheet thickness (T1, T2), a quality measurement of the welding edges and the relative positioning of the main spot and auxiliary spot.

\* \* \* \* \*